US011932116B1

(12) United States Patent
Secrest et al.

(10) Patent No.: US 11,932,116 B1
(45) Date of Patent: Mar. 19, 2024

(54) OPERATING AN ELECTRIC DRIVE SYSTEM WITH LOW EFFICIENCY

(71) Applicant: BorgWarner Inc., Auburn Hills, MI (US)

(72) Inventors: Caleb Wayne Secrest, Noblesville, IN (US); Siddharth Ballal, Fishers, IN (US); Vignesh Namasivayam, Fishers, IN (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 17/944,642

(22) Filed: Sep. 14, 2022

(51) Int. Cl.
*H02P 6/14* (2016.01)
*B60L 15/02* (2006.01)
*H02P 21/22* (2016.01)
*H02P 27/06* (2006.01)

(52) U.S. Cl.
CPC ............ *B60L 15/025* (2013.01); *H02P 21/22* (2016.02); *H02P 27/06* (2013.01); *B60L 2240/423* (2013.01)

(58) Field of Classification Search
CPC ......... H02P 21/22; H02P 27/06; B60L 15/025
USPC .................................................... 318/400.26
See application file for complete search history.

(56) References Cited

U.S. PATENT DOCUMENTS

| | | | | |
|---|---|---|---|---|
| 7,023,150 | B2* | 4/2006 | Hisada | F02N 11/0814 318/434 |
| 7,893,637 | B2* | 2/2011 | Suhama | H02P 3/18 318/434 |
| 2011/0260659 | A1* | 10/2011 | Kamachi | B60L 15/2009 318/139 |
| 2017/0355373 | A1* | 12/2017 | Dalum | F16H 61/0031 |
| 2020/0313526 | A1* | 10/2020 | Gabrys | H02K 3/28 |

* cited by examiner

*Primary Examiner* — Erick D Glass
(74) *Attorney, Agent, or Firm* — REISING ETHINGTON P.C.

(57) ABSTRACT

A control system configured to control a rotating electrical machine of a battery electric vehicle (BEV), having one or more microprocessors that execute a low-efficiency mode of operation for the BEV, such that the low-efficiency mode of operation includes determining a high-efficiency mode current command corresponding to operation at a determined physical rotor angular velocity of a rotor of the rotating electrical machine at a commanded torque value, and increasing current supplied to the rotating electrical machine to a level corresponding to operation at an angular velocity higher than the determined physical angular velocity of the rotor at the commanded torque value.

19 Claims, 3 Drawing Sheets

OPERATING AN ELECTRIC DRIVE SYSTEM WITH LOW EFFICIENCY

TECHNICAL FIELD

The present application relates to control systems and, more particularly, to control systems included with battery electric vehicles (BEVs).

BACKGROUND

Modern vehicles are increasingly propelled wholly or at least partially by one or more electric motors—also referred to as rotating electrical machines. Power electronics can receive electrical power from a vehicle battery and regulate the supply of electrical current to the BEV. BEVs operate in varied environments having a wide range of temperatures. The power electronics can be tasked with optimizing the control of electric motors on the BEV over the wide range of temperatures such that particular performance metrics are met across the range. It would be helpful to ensure the performance metrics are possible at low-temperatures.

SUMMARY

In one implementation, a control system configured to control a rotating electrical machine of a battery electric vehicle (BEV), having one or more microprocessors that execute a low-efficiency mode of operation for the BEV, such that the low-efficiency mode of operation includes determining a high-efficiency mode current command corresponding to operation at a determined physical rotor angular velocity of a rotor of the rotating electrical machine at a commanded torque value, and increasing current supplied to the rotating electrical machine to a level corresponding to operation at an angular velocity higher than the determined physical angular velocity of the rotor at the commanded torque value.

In another implementation, a control system configured to control a rotating electrical machine of a BEV, having one or more microprocessors that execute a low-efficiency mode of operation for the BEV, such that the low-efficiency mode of operation includes determining that an ambient temperature or some portion of the BEV exist at or below a predetermined temperature; determining a maximum permissible rotor angular velocity at a commanded torque value; and adding a desired amount of inefficiency to a high-efficiency current command value that is equal to or less than a current command value at the maximum permissible rotor angular velocity at the commanded torque value.

In yet another implementation, a control system configured to control a rotating electrical machine of a BEV, having one or more microprocessors that execute a low-efficiency mode of operation for the BEV, such that the low-efficiency mode of operation includes determining that an ambient temperature or some portion of the BEV exist at or below a predetermined temperature; determining a high-efficiency d-axis current command for a commanded torque; determining a maximum d-axis current command for the commanded torque; determining a desired amount of inefficiency to be added to the high-efficiency d-axis current command that will be equal to or less than the maximum d-axis current command to generate a low-efficiency mode current command.

DETAILED DESCRIPTION

A control system can purposely operate a rotating electrical machine (electric motor) of a battery electric vehicle (BEV) in a low-efficiency mode for cold starts during low temperatures (e.g., <20° Centigrade (C)). The low-efficiency mode can quickly increase battery temperature and rotating electric machine hardware temperature while maintaining an ability to produce a commanded torque amount output by the rotating electrical machine. The low-efficiency mode can involve increasing the flow of current beyond an amount typically specified at a commanded torque value.

Figure 1:
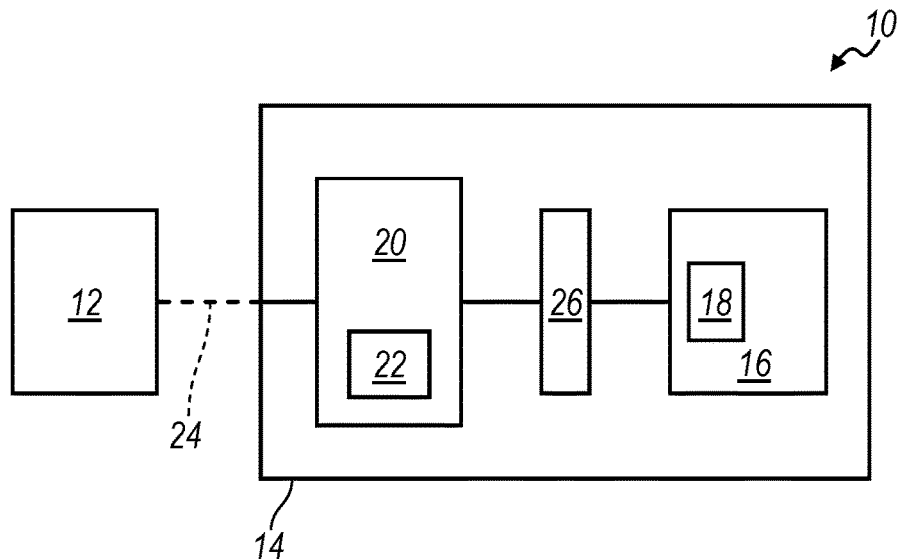
FIG. 1 is a block diagram depicting an implementation of a battery electric vehicle.

Turning to FIG. 1, an implementation of an electrical system 10 is shown. The system 10 includes an electrical grid 12 and a battery electric vehicle (BEV) 14 that can receive electrical power from the grid 12. The electrical grid 12 can include any one of a number of electrical power generators and electrical delivery mechanisms. Electrical generators (not shown) create AC electrical power that can then be transmitted a significant distance away from the electrical generator for residential and commercial use. The electrical generator can couple with the electrical grid 12 that transmits the AC electrical power from the electrical generator to an end user, such as a residence or business.

The BEV 14 includes one or more rotating electrical machines 16 (also referred to as electric motors) that include a stator having stator windings and a rotor that can be angularly displaced relative to the stator (not shown). In one implementation, the rotating electrical machine 16 is a permanent magnet synchronous electrical machine, which includes a rotor having a plurality of angularly-spaced permanent magnets. The permanent magnets can be made from any one of a number of different materials, one example of which is a neodymium alloy or other rare earth element. As noted above, the stator windings can receive electrical current the supply of which can be regulated by a control system 18 that induces the angular displacement of the rotor relative to the stator. The control system 18 can include an array of power control electronics and microprocessors that facilitate the operation of the rotating electrical machine 16. These electronics may include an inverter implemented using a plurality of MOSFETs that switch on and off according to a choreographed order and timing at the direction of a motor controller to induce rotor angular movement. The control system 18 can output current commands that regulate the electrical current supplied to the rotating electrical machine 16. The current commands can be divided into quadrature ($I_q$) and direct ($I_d$) current commands as part of a field-oriented control system. The motor controller can be implemented using one or more microprocessors having input/output and non-volatile memory where data can be stored and accessed. In addition to the inverter, the control system 18 can include a DC-DC converter to regulate voltage levels of electrical power supplied to the electrical machine 16. The control system 18 can also include one or more thermistors used to determine the ambient temperature and the temperature of the rotating electrical machine 16.

BEV service equipment 20, also referred to as a BEV charging station, can receive AC electrical power from the grid 12 and provide the electrical power to the BEV 14. The BEV service equipment 20 can include an input terminal that receives the AC electrical power from the grid 12 and communicates the AC electrical power to an on-board vehicle battery charger included on the BEV 14. The on-board vehicle battery charger can include an AC/DC inverter so that the AC electrical power received from the grid 12 can be supplied to a vehicle battery 26. An electrical cable 24 can detachably connect with an electrical receptacle on the BEV 14 and electrically link a BEV charging station with the BEV 14 so that AC electrical power can be communicated between the charging station and the BEV 14. The BEV charging station can be classified as "Level 2" BEV service equipment that receives 240 VAC from the grid 12 and supplies 240 VAC to the BEV 14. It is possible the level of AC electrical power input to a charging station and/or the level of AC electrical power output from a charging station is different in other implementations.

The term "battery electric vehicle" or "BEV" can refer to vehicles that are propelled, either wholly or partially, by rotating electrical machines or motors. BEV can refer to electric vehicles, plug-in electric vehicles, hybrid-electric vehicles, and battery-powered vehicles. The vehicle battery 26 can supply DC electrical power, that has been converted from AC electrical power, to the electrical machine(s) 16 that propel the BEV. As noted above, the control system 18 can convert the DC electrical power into AC electrical power to induce angular movement of the rotor relative to the stator. The vehicle battery 26 or batteries are rechargeable and can include lead-acid, nickel cadmium (NiCd), nickel metal hydride, lithium-ion, and lithium polymer batteries, to name a few. A typical BEV battery voltage is 200 to 800 VDC.

Figure 2:
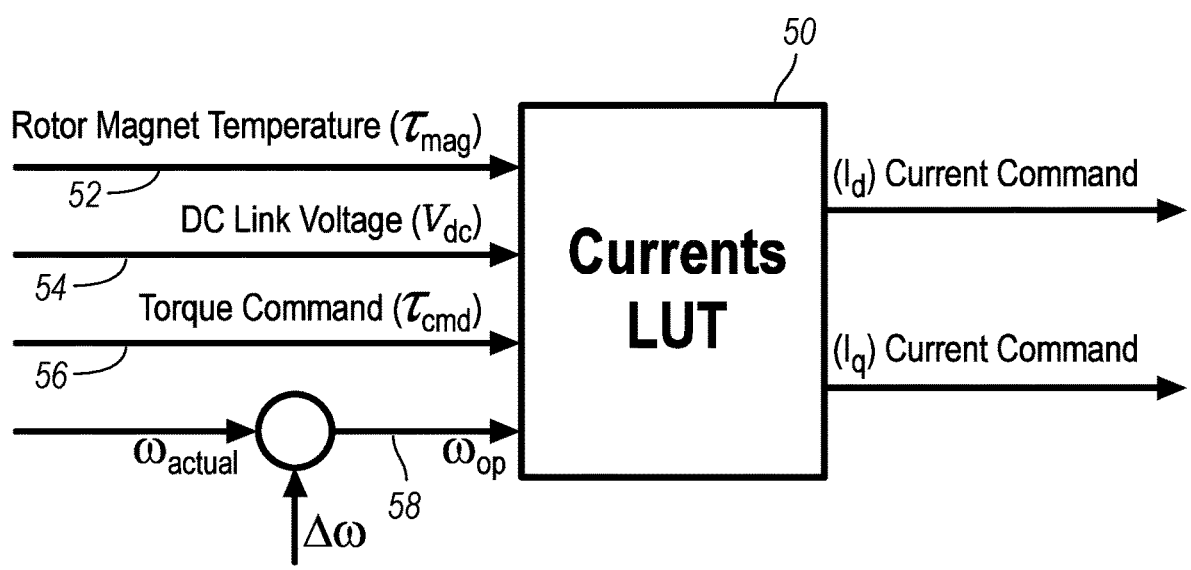
FIG. 2 is a block diagram depicting an implementation of a portion of a control system.
Figure 3:
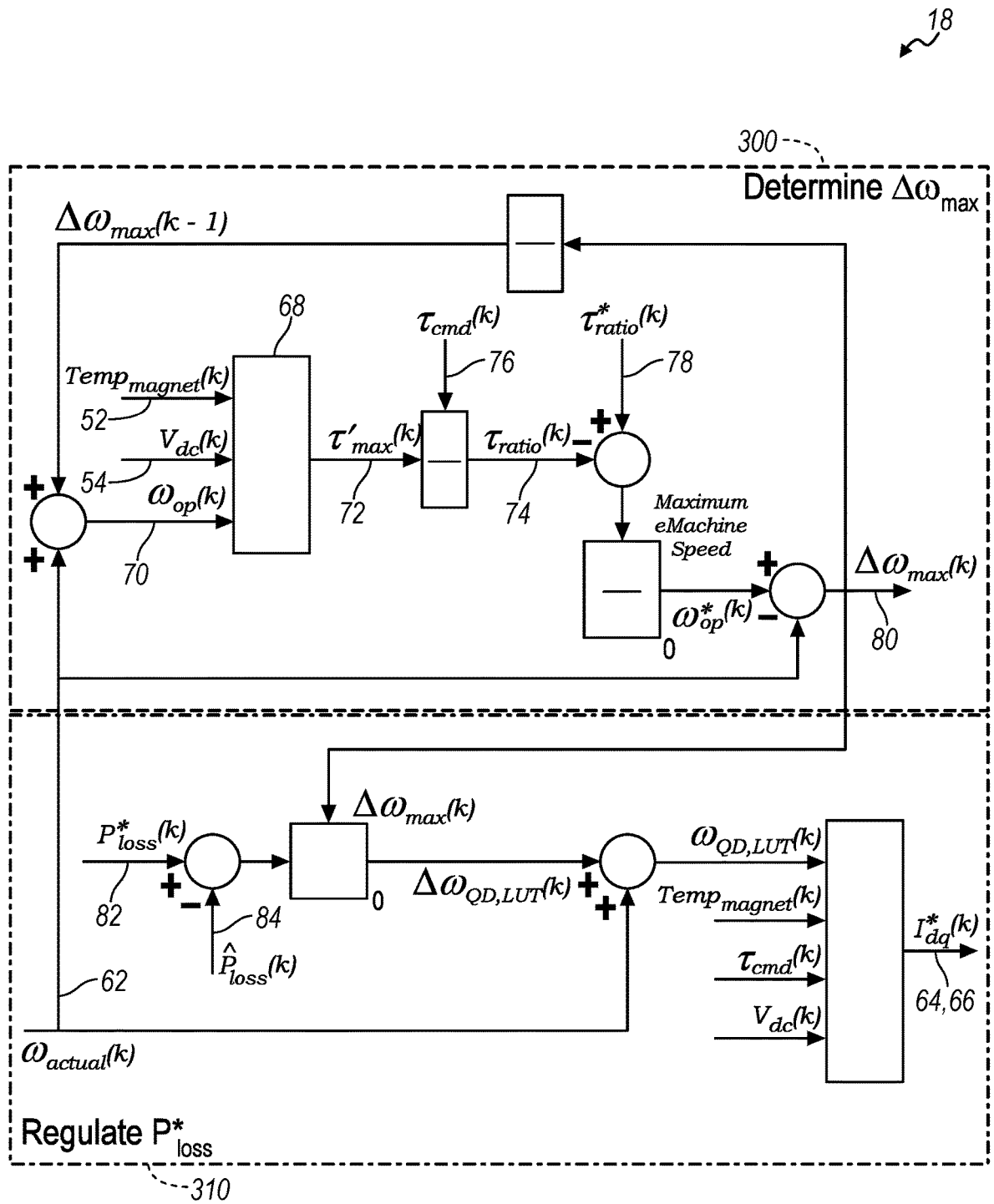
FIG. 3 is a block diagram depicting an implementation of another portion of the control system.

Turning to FIGS. 2-3, an aspect of the control system 18 is shown in more detail. The control system 18 can include look-up tables (LUT) and controllers, such as PI or PID controllers, for controlling the electrical current supplied to the rotating electrical machine(s) 16. An electrical current LUT 50 can receive inputs that include a rotor magnet temperature ($T_{mag}$) 52, a DC link voltage ($V_{dc}$) 54, a desired torque amount ($\tau_{cmd}$) 56, and a commanded low-efficiency mode rotor angular velocity ($\omega_{op}$) 58 that can be determined by adding a permissible change in rotor angular velocity ($\Delta\omega$) 60 to a determined physical rotor angular velocity ($\omega_{actual}$) 62. The commanded low-efficiency mode rotor angular velocity ($\omega_{op}$) 58 can be set to a value above the physical rotor angular velocity ($\omega_{actual}$) 62 but below a maximum value ($\omega_{max}$) corresponding to the maximum physical rotor angular velocity in which the desired torque amount ($\tau_{cmd}$) is feasible. These inputs can be used to access the electrical current LUT 50 stored in non-volatile memory and determine corresponding $I_d$ and $I_q$ current commands 64, 66.

Generally speaking, a low-efficiency mode for cold starts can begin by determining that the ambient temperature, some portion of the rotating electrical machine 16, or both exist at or below a predetermined temperature. The control system 18 can then determine a maximum permissible change in rotor angular velocity commanded ($\Delta\omega_{max}$). Given the determined maximum permissible change in rotor angular velocity ($\Delta\omega_{max}$), a desired amount of loss or inefficiency can be identified and, based on the desired amount of loss, a value of $\Delta\omega$ equal to or less than $\Delta\omega_{max}$ can be selected and added to the determined physical rotor angular velocity ($\omega_{actual}$) to generate the low-efficiency mode rotor angular velocity ($\omega_{op}$) 70.

FIG. 3 depicts an implementation of a portion of the control system 18. The control system 18 can include a portion 300 to determine the maximum permissible change in rotor angular velocity ($\Delta\omega_{max}$) and another portion 310 that can regulate the amount of loss or inefficiency during the low-efficiency mode and generates $I_q$ and $I_d$ current commands. The control system 18, including portions 300 and 310, can be applied to existing BEV control systems such that the system 18 can use existing high-efficiency dq-current command LUTs. Determining $\Delta\omega_{max}$ can begin by looking up $\tau'_{max}(k)$ 72 using the relationship $\omega_{op}(k)=\Delta\omega_{max}(k-1)+\omega_{actual}(k)$, where k relates to the number of executions of a digital control system. The values for maximum torque can be defined and stored in a peak torque LUT 68. A ratio of commanded or desired torque ($\tau'_{ratio}(k)$) 74 can be determined by dividing the commanded or desired torque $\tau_{cmd}(k)$ 76 by $\tau'_{max}(k)$ 72. $\tau'_{ratio}(k)$ 74 can be regulated relative to $\tau^*_{ratio}(k)$ 78 using integral control. The integral control output $\omega^*_{op}(k)$ 58 can saturate between 0 and the maximum operating angular velocity of the rotor. Maximum change in rotor angular velocity $\Delta\omega_{max}(k)$ 80 can be determined by subtracting $\omega_{actual}(k)$ 62 from $\omega_{op}(k)$ 58.

The value of $\Delta\omega_{max}(k)$ 80 can be provided from the portion 300 that determines the maximum permissible change in rotor angular velocity ($\Delta\omega_{max}$) to another portion 310 that regulates the amount of loss or inefficiency during the cold mode and generates $I_q$ and $I_d$ current commands 64, 66. A commanded loss value $P^*_{loss}(k)$ 82 can be provided by a portion of the control system 18 external to portions 300 and 310. A proportional and integral (PI) controller can regulate $P^\wedge_{loss}(k)$ 84 to $P^*_{loss}(k)$ 82. Estimated losses desired and created during low-efficiency mode can be stored in the control system 18. The control system 18 can limit an output of the PI controller $\Delta\omega_{qd,\,LUT}(k)$ to maintain within a range between 0 and $\Delta\omega_{max}(k)$ and derive $\omega_{qd,\,LUT}(k)$ 86. The control system 18 can access an LUT to generate current command values ($I^*_{dq}(k)$) 64, 66 using $\omega_{qd,\,LUT}(k)=\Delta\omega_{qd,\,LUT}(k)+\omega_{actual}(k)$.

Figure 4:
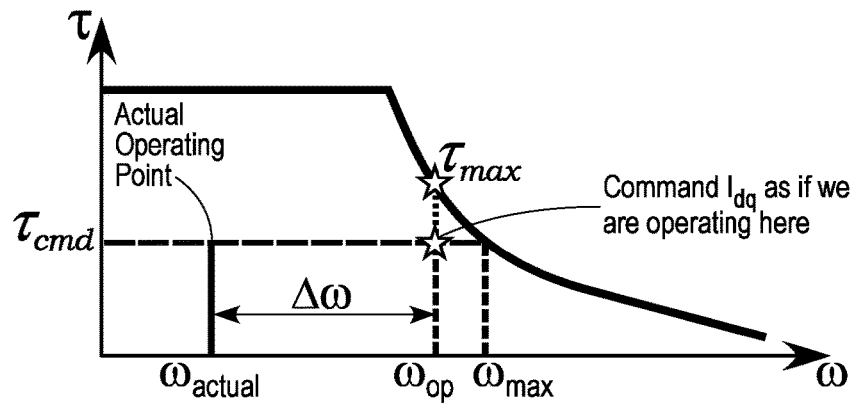
FIG. 4 is another graphical representation depicting an implementation of operating a battery electric vehicle (BEV) in a low-efficiency mode.

FIG. 4 depicts the relationship between torque ($\tau$) output by the rotating electrical machine 16 and the angular velocity of the rotor ($\omega$) of the machine 16. During high-efficiency mode, the current commands $I_q$ and $I_d$ can be determined based on the determined physical rotor angle velocity ($\omega_{actual}$). However, while in low-efficiency mode, the current commands $I_q$ and $I_d$ can be determined as though the angular velocity of the rotor is higher, yet less than $\omega_{max}$. The current commands $I_q$ and $I_d$ can be determined as though angular velocity of the rotor is $\omega_{op}$ even though the rotor of the rotating electrical machine 16 is not operating at an angular velocity above $\omega_{actual}$.

Figure 5:
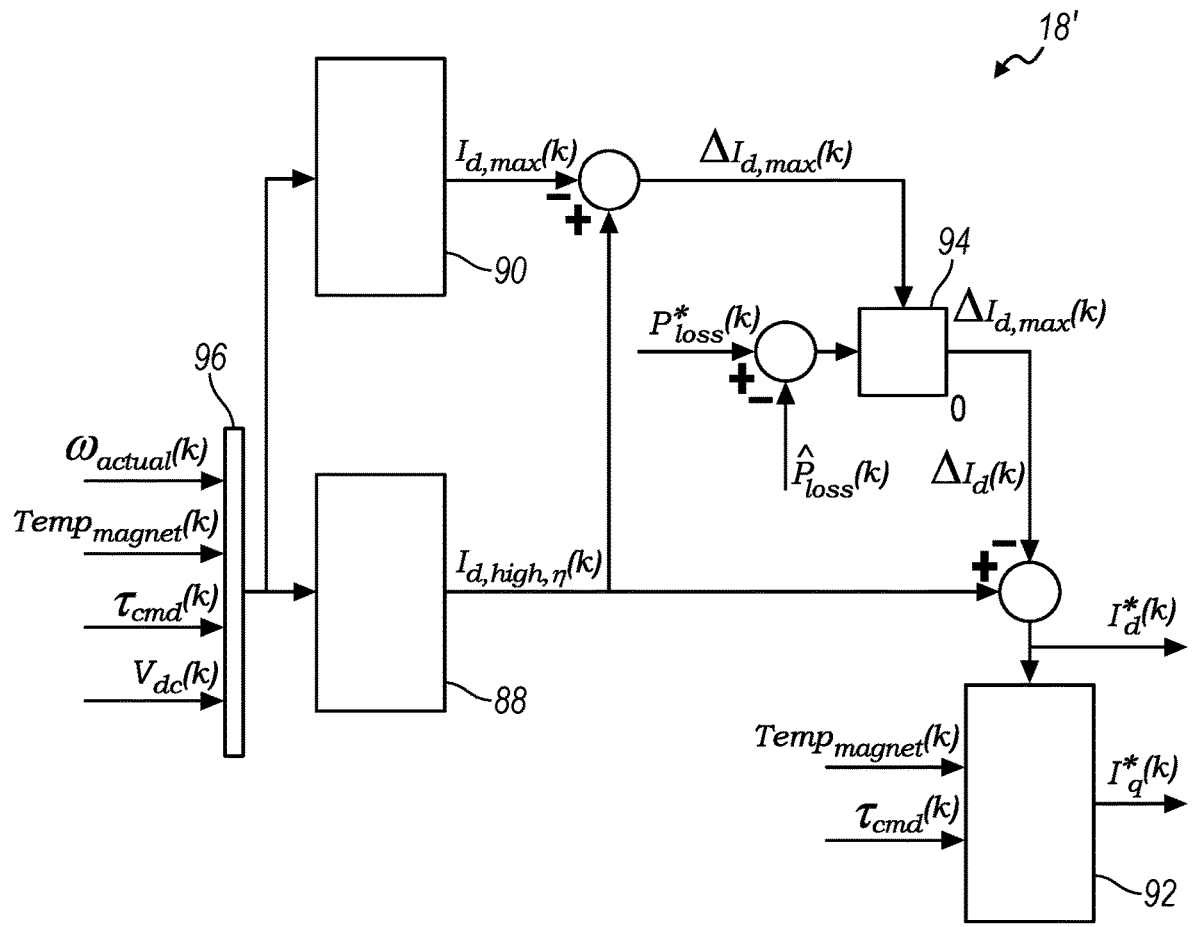
FIG. 5 is a block diagram depicting another implementation of a portion of a control system.

FIG. 5 depicts another implementation of the control system 18'. The control system 18' can look up a high-efficiency d-axis current command ($I_{d,high,n}(k)$) for the current operating conditions in a high-efficiency d-axis current LUT 88. The control system 18' can then look up a maximum possible d-axis current command ($I_{d,max}(k)$) for the current operating conditions in a maximum d-axis current LUT 90. The control system 18' can then include a PI controller 94 that regulates the power loss and outputs a $\Delta I_d(k)$ between 0 and the $\Delta I_{d,max}(k)$. The control system 18' can then calculate the d-axis current command as $I^*_d(k)=I_{d,high,n}-\Delta I_d(k)$. An amount of power loss can then be created by altering the high-efficiency d-axis current command to increase the d-axis commanded current an amount above the high-efficiency value but less than the maximum possible value. The control system 18' can then look up a q-axis current command WO based on a determined d-axis current command ($I^*_d$). A processor 96 can receive inputs including a rotor magnet temperature $T_{mag}(k)$, a DC link voltage $V_{dc}(k)$, a desired torque amount $\tau_{cmd}(k)$, and a determined physical rotor angular velocity ($\omega_{actual}$). The control system 18' can include a maximum possible d-axis current LUT, a normal mode (high-efficiency) d-axis current LUT, and a q-axis current LUT 92.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A control system configured to control a rotating electrical machine of a battery electric vehicle (BEV), comprising:
    one or more microprocessors that execute a low-efficiency mode of operation for the BEV, wherein the low-efficiency mode of operation includes:
    determining a high-efficiency mode current command corresponding to operation at a determined physical rotor angular velocity of a rotor of the rotating electrical machine at a commanded torque value, and increasing current supplied to the rotating electrical machine to a level corresponding to operation at an angular velocity higher than the determined physical angular velocity of the rotor at the commanded torque value to intentionally increase a temperature of the rotating electrical machine.

2. The control system recited in claim 1, further comprising a current look-up table (LUT) for determining the current command value.

3. The control system recited in claim 1, further comprising a torque look-up table (LUT) for determining a maximum torque value.

4. The control system recited in claim 1, further comprising determining a rotor magnet temperature.

5. The control system recited in claim 1, further comprising determining an inverter voltage limit and an inverter current limit.

6. The control system recited in claim 1, further comprising determining that an ambient temperature or a rotor magnet temperature is below a predetermined temperature threshold.

7. The control system recited in claim 1, further comprising determining that a vehicle battery temperature is below a predetermined temperature threshold.

8. The control system recited in claim 1, further comprising determining a ratio of torque commanded relative to a maximum torque value.

9. A control system configured to control a rotating electrical machine of a battery electric vehicle (BEV), comprising:
    one or more microprocessors that execute a low-efficiency mode of operation for the BEV, wherein the low-efficiency mode of operation includes:
    determining that an ambient temperature or some portion of the BEV exist at or below a predetermined temperature;
    determining a maximum permissible rotor angular velocity at a commanded torque value; and
    adding a desired amount of inefficiency to a high-efficiency current command value that is equal to or less than a current command value at the maximum permissible rotor angular velocity at the commanded torque value.

10. The control system recited in claim 9, further comprising a current look-up table (LUT) for determining the current command value.

11. The control system recited in claim 9, further comprising a torque look-up table (LUT) for determining the maximum permissible change in rotor angular velocity commanded.

12. The control system recited in claim 9, further comprising determining a rotor magnet temperature.

13. The control system recited in claim 9, further comprising determining an inverter voltage limit and an inverter current limit.

14. The control system recited in claim 9, further comprising determining that an ambient temperature or a rotor magnet temperature is below a predetermined temperature threshold.

15. The control system recited in claim 8, further comprising determining a ratio of torque commanded relative to a maximum torque value.

16. A control system configured to control a rotating electrical machine of a battery electric vehicle (BEV), comprising:
    one or more microprocessors that execute a low-efficiency mode of operation for the BEV, wherein the low-efficiency mode of operation includes:
    determining that an ambient temperature or some portion of the BEV exist at or below a predetermined temperature; determining a high-efficiency d-axis current command for a commanded torque;
    determining a maximum d-axis current command for the commanded torque;
    determining a desired amount of inefficiency to be added to the high-efficiency d-axis current command that will be equal to or less than the maximum d-axis current command to generate a low-efficiency mode current command.

17. The control system recited in claim 16, further comprising a current look-up table (LUT) for determining a maximum d-axis current.

18. The control system recited in claim 16, further comprising a high-efficiency d-axis current look-up table (LUT) for determining the high-efficiency d-axis current command.

19. The control system recited in claim 16, further comprising a q-axis current look-up table (LUT) for determining q-axis current corresponding to an output d-axis current command.

\* \* \* \* \*